(12) United States Patent  
Kreamer

(10) Patent No.: US 6,722,689 B2  
(45) Date of Patent: Apr. 20, 2004

(54) FLEXIBLE HANDLE JOGGING STROLLER

(76) Inventor: David Harrison Kreamer, 13013 W. 118th Ter., Overland Park, KS (US) 66210

( * ) Notice: Subject to any disclaimer, the term of this patent is extended or adjusted under 35 U.S.C. 154(b) by 0 days.

(21) Appl. No.: 10/050,904

(22) Filed: Jan. 16, 2002

(65) Prior Publication Data

US 2003/0132614 A1 Jul. 17, 2003

(51) Int. Cl.$^7$ ................................................ B62B 7/00
(52) U.S. Cl. ........................ 280/642; 280/47.38; 482/51
(58) Field of Search ........................ 16/421, 422, 426, 16/408, 430; 482/51, 62, 68, 74, 127, 904; 280/47.11, 47.38, 642, 647, 650

(56) References Cited

U.S. PATENT DOCUMENTS

| | | | | |
|---|---|---|---|---|
| 3,503,276 A | * | 3/1970 | Vigot | 74/544 |
| 4,212,480 A | * | 7/1980 | Mikina et al. | 280/226.1 |
| 5,242,362 A | * | 9/1993 | Talamantez | 492/13 |
| 5,375,861 A | | 12/1994 | Gifford | 280/47.38 |
| 5,431,614 A | * | 7/1995 | Jeranson | 482/57 |
| 5,511,802 A | | 4/1996 | Aitken | 280/1.5 |
| 5,562,300 A | | 10/1996 | Nelson | 280/655.1 |
| 5,674,165 A | * | 10/1997 | Cohen et al. | 482/127 |
| 5,758,548 A | * | 6/1998 | Smith | 74/551.1 |
| 5,762,593 A | * | 6/1998 | Whiteley | 482/134 |
| 5,775,708 A | * | 7/1998 | Heath | 280/234 |
| 5,876,309 A | * | 3/1999 | Archey | 482/66 |
| 5,878,853 A | * | 3/1999 | DeRouen et al. | 190/116 |
| 6,098,993 A | * | 8/2000 | Bellinson | 280/1.5 |
| 6,196,947 B1 | * | 3/2001 | Anderson | 482/51 |
| 6,317,924 B1 | * | 11/2001 | Gallagher | 16/114.1 |
| 6,349,949 B1 | * | 2/2002 | Gorringe | 280/1.5 |
| 6,360,402 B1 | * | 3/2002 | Crabtree | 16/430 |
| 2001/0047569 A1 | * | 12/2001 | Cacciacarne | 16/426 |

* cited by examiner

Primary Examiner—Brian L. Johnson  
Assistant Examiner—Kelly E Campbell  
(74) Attorney, Agent, or Firm—Kenneth W. Iles

(57) ABSTRACT

A jogging stroller for carrying a baby includes three wheels mounted on a frame that holds a cloth seat and includes frame rails that project upwardly and rearwardly from a single front wheel to a horizontal handlebar member at the rear of the stroller. A pair of handles are attached to the handlebar members by a clamp and these include a stem member that extends outwardly from the stroller handlebar and are connected to a perpendicular handle element that can rotate about the stem member and the stem members can be rotated about the axis of the horizontal stroller handlebar and can be slid along the handlebar. The handle elements can be fixed in space in a position desired by the user or can be left loose enough to rotate during use. The handle elements have a coil spring inside a grip member, allowing the handles to flex as the user jogs, thereby permitting more natural motion of the hands and shoulders during jogging.

19 Claims, 5 Drawing Sheets

FLEXIBLE HANDLE JOGGING STROLLER

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention is directed to a jogging stroller that allows the user to move his arms and shoulders more naturally while jogging and pushing the stroller. More particularly, the present invention is directed to a jogging stroller having flexible handles.

2. Description of the Related Art Including Information Disclosed Under 37 C.F.R. 1.97 and 1.98

Parents of babies or young children are often concerned with physical fitness and like to run or jog to maintain fitness. They also often like to take their babies or young children outdoors in a baby stroller. Many parents like to combine these two activities by pushing a stroller with the baby seated securely in the stroller while the parent jogs.

Many strollers, particularly those with four small wheels, are not stable enough to be suitable for this type of use. Therefore, several modified types of strollers have been developed to permit more comfortable and safer use as jogging strollers. A number of these designs have been patented, as discussed below.

U.S. Pat. No. 5,375,861, issued to Gifford on Dec. 27, 1994, discloses a No-Hands Baby Stroller comprising a three-wheeled stroller connected to the adult user by a bar 25 fastened to a belt around her waist. The bar 25 is free to move up and down as the adult user jogs. The bar 25 is like a wagon tongue that is pushed instead of pulled and is free to pivot up or down at both ends. This design prevents the user from holding the stroller and does not appear to permit safe steering of the stroller and does not allow the user to disengage from the tongue quickly in case of emergency.

U.S. Pat. No. 5,511,802, issued to Aitken on Apr. 30, 1996, discloses a Single Wheel baby Stroller comprising a belt around the adult user's waist that is connected to a rigid bar having a shock absorber between two ends of the bar. A handle 33 is available for holing onto but it is not necessary to hold onto it. The belt supports the rear of the stroller. It does not appear that the connection at 53 pivots. This design does not permit the user to disengage quickly from the device in case of emergency and does not permit positive responsive steering of the stroller. Further, it does causes the stroller, and hence the baby, to bounce up and down as the user's waist bounces up and down.

U.S. Pat. No. 5,562,300, issued to Nelson on Oct. 8, 1996, discloses a Jogging Stroller comprising a three-wheeled stroller having a pair of spaced parallel upwardly extending handles 40, 42 (FIGS. 1, 3) topped with rubber grips. The handles are fastened to the more-or-less horizontal frame elements by nuts and bolts at the rear of the horizontal frame members and a reinforced by mounting plates. The handles can be pivoted forward for storage, but are intended to be fixed and immovable during use (Col. 5, lines 35–48). The reciprocal motion of the handle grips does not allow the hands and arms to move from side-to-side, which is a natural motion during jogging that is required for proper balance and for reducing stress on the lower back during running.

U.S. Pat. No. 5,674,165, issued to Cohen et al. on Oct. 7, 1997, discloses an Exercising Device for Use with a Baby Stroller comprising a stroller having a pair of upright spaced parallel handles that pivot independently where they join the stroller's frame. This allows the adult user to move her arms back and forth as she walks or jogs without tilting the stroller and while maintaining control of the stroller. This design is similar to Nelson '300, discussed immediately above, in that it permits back-and-forth reciprocal motion of the user's hands and arms, but does not permit any side-to-side movement of the hands and arms.

U.S. Pat. No. 5,876,309, issued to Archey, to Mar. 2, 1999, discloses a Jogging Exercise Stroller comprising a stroller with a pair of upwardly sloped handles extending upwardly from the stroller's frame and ending in a horizontal cross bar. A pair of spaced parallel upwardly extending gripping handles are separately and pivotally connected to the horizontal cross bar and include a hand sling 32 at their far ends. The gripping handles are connected to a lower horizontal cross bar by shock absorbers of the fluid-valve type (like on an automobile) to dampen the up and down motions of the gripping handles, which move forward and backward as the adult user swings her arms during walking or running (FIG. 2). This design has the same deficiencies as the two references discussed immediately above, despite the addition of shock absorbers to dampen the free movement of the upwardly extending handles.

U.S. Pat. No. 6,098,993, issued to Bellinson on Aug. 8, 2000, discloses an Attachment for a Baby Stroller comprising a three-wheeled stroller having a horizontal cross bar at about waist height. The adult user wears a belt about her waist, which is fastened to a pair of spaced push bars at one end and to the stroller's horizontal cross bar at the other ends (FIG. 2). This design is similar to Gifford '861, discussed above, but has two spaced parallel tongues as opposed to the single tongue of Gifford '861, and so suffers from the same deficiencies and problems as does Gifford '861.

U.S. Pat. No. 6,196,947 B1, issued to Anderson on Mar. 6, 2001, discloses a Stroller Having an Upper Body Exercise Propulsion Mechanism comprising a pair of spaced substantially upright pivoting handles topped with rubber grips. The handles are harder to move forward than backward. The intent is to provide upper body exercise while pushing the stroller. The embodiment shown in FIG. 4 includes resistance mechanisms 28 where the upright handles are connected to a frame extension, while the embodiment shown in FIG. 1 includes longitudinal resistance elements 24, which are rubber bands or bungee cords (Column 3, lines 11–12). With its back-and-forth reciprocating upright handles, Anderson '947 is similar to Nelson '300 and Cohen et al. '165, discussed above, and hence it suffers from the same deficiencies and problems as those two designs.

None of these designs allow for any motion approaching the natural motion of a persons' hands and arms while jogging or running. None of these designs substantially isolate the stroller from the irregular movements of the user's hands and arms while they are running. None of these designs offer a variety of positions and attitudes for the handles that would allow a user to adjust the handles to a position that is comfortable and safe for him.

Therefore, a need exists for a jogging stroller that permits natural motion of a person's hands and arms while jogging or running behind the stroller while holding the stroller with one or two hands; for such a jogging stroller that isolates the stroller from the irregular movements of the user's hands and arms while the person is running; for offering a variety of positions and attitudes for the handles that allows a user to adjust the handles to a position that is comfortable and safe for him.

BRIEF SUMMARY OF THE INVENTION

Accordingly, it is a primary object of the present invention to provide a jogging stroller that permits natural motion of a person's hands and arms while jogging or running behind the stroller while holding the stroller with one or two hands.

It is another object of the present invention to provide a jogging stroller that isolates the stroller from the irregular movements of the user's hands and arms while the person is jogging behind the jogging stroller and holding onto the jogging stroller.

It is another object of the present invention to provide a jogging stroller that offers a variety of positions and attitudes for the handles that allows a user to adjust the handles to a position that is comfortable and safe for him.

These and other objects of the present invention are achieved by providing a stroller with at least three relatively large wheels connected to a frame that carries a sling-type seating cradle that the baby is placed into. The cradle preferably includes a seat belt to secure the baby into the stroller. A conventional horizontal handle bar is connected to the frame and extends horizontally across the width of the frame a comfortable distance above the ground and is perpendicular to the longitudinal front-to-rear axis of the stroller.

A pair of handle extension members are connected to the horizontal handle bar by fittings that allow the handle extension members to be fixedly positioned anywhere along the length of the horizontal handle and to be pivoted about the axis of the horizontal handle at any desired angle. A handle is connected to each handle extension member and can be pivoted about the handle extension member at any angle in the plane of rotation of the handle. This arrangement permits adjustment of the handles into virtually any desired angle or position. Each handle is a coil spring that easily bends in the direction of the force applied to it, while offering a comfortable amount of resistance, and which immediately springs back to its original straight-line configuration when the deforming force is removed.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

DETAILED DESCRIPTION OF THE INVENTION

As required by the Patent Statutes and the case law, the preferred embodiment of the present invention and the best mode currently known to the inventor for carrying out the invention are disclosed in detail herein. The embodiments disclosed herein, however, are merely illustrative of the invention, which may be embodied in various forms. Therefore, specific structural and functional details disclosed herein are not to be interpreted as limiting, but merely to provide the proper basis for the claims and as a representative basis for teaching one skilled in the art to which the invention pertains to make and use the apparatus disclosed herein as embodied in any appropriately specific and detailed structure.

Figure 1:
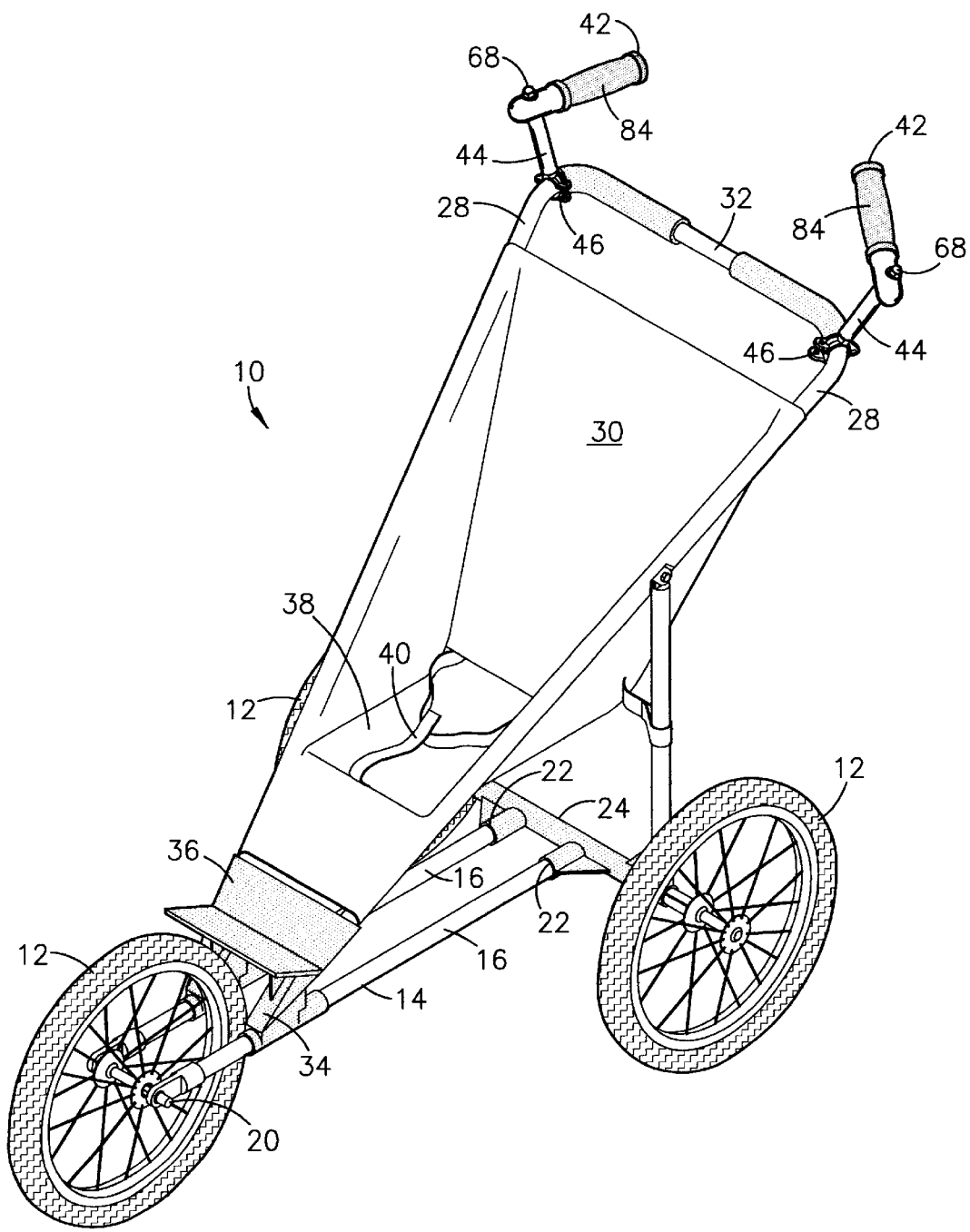
FIG. 1 is a left-hand front perspective view of a flexible handle jogging baby stroller according to the present invention.

Referring to FIG. 1, the flexible handle jogging stroller 10 for carrying an infant, a baby or a young child includes three large-diameter wheels 12, which are connected to a frame 14 in a triangle pattern. The wheels may be of any type, for example, spoked, or made from solid material, and so forth, but are preferably pneumatic tires mounted on wheels as shown in the FIG., since this construction reduces angular momentum in the wheels. A stroller 10 may have any necessary number of wheels or type of frame. The frame 14 includes a pair of longitudinally extending frame rails 16, each having a front end terminating in a wheel lug 18 for retaining the axle 20 of the front wheel. The rear end of the horizontal frame rails 16 are pushed into cylindrical fittings 22 on a perpendicular but horizontal rear cross member 24, which has threaded axle bolts on each end for receiving one rear wheel on each end of the cross member 24. A pair of spaced vertical frame rails 26 are fastened to the rear cross member 24 at the lower ends and project upwardly to a point where they are joined to the downwardly sloped seat frame rails 28, which are sild through a seam along each side of the flexible cloth seating cavity 30. The upper ends of the downwardly sloped rear frame rails are connected by a horizontal stroller handle bar, which may be integrally formed from a single piece of tubbing, while their lower ends, which tend to converge, are seated into tubular fittings 34 that are mounted onto the horizontal front frame rails 16 adjacent to the front of these rails. A foot rest 36 is mounted on the frame 14 adjacent to the lower end of the seating cavity 30. The seating cavity 30 includes a seat portion 38, which is equipped with a seat belt 40. The frame 14 is preferable made from low density high strength metal tubing, with the fittings and foot rest made from nylon or plastic. The seating cavity is preferably made from cloth. The entire stroller 10 may be constructed so that it can be collapsed basically into a plane and the wheels may be equipped with quick-release fittings to make it easy to remove and install them.

Still referring to FIG. 1, a pair of handles 42 is mounted onto the stroller handlebar 32. Any type of handle or means for holding onto the stroller 10 is defined as a "handlebar" and the handles or handle assembly 42 can be mounted on any type of handlebar. Each handle 42 includes a handle stem member 44 connected at a lower end to a mounting clamp or clamshell clamp 46 that is adjustably fixed to the stroller handlebar 32. The upper end of each handle stem 44 passes through an handle element 48, which is perpendicular to the handle stem member 44. This structure permits extensive adjustment of the handles 42, as discussed below.

Figure 2:
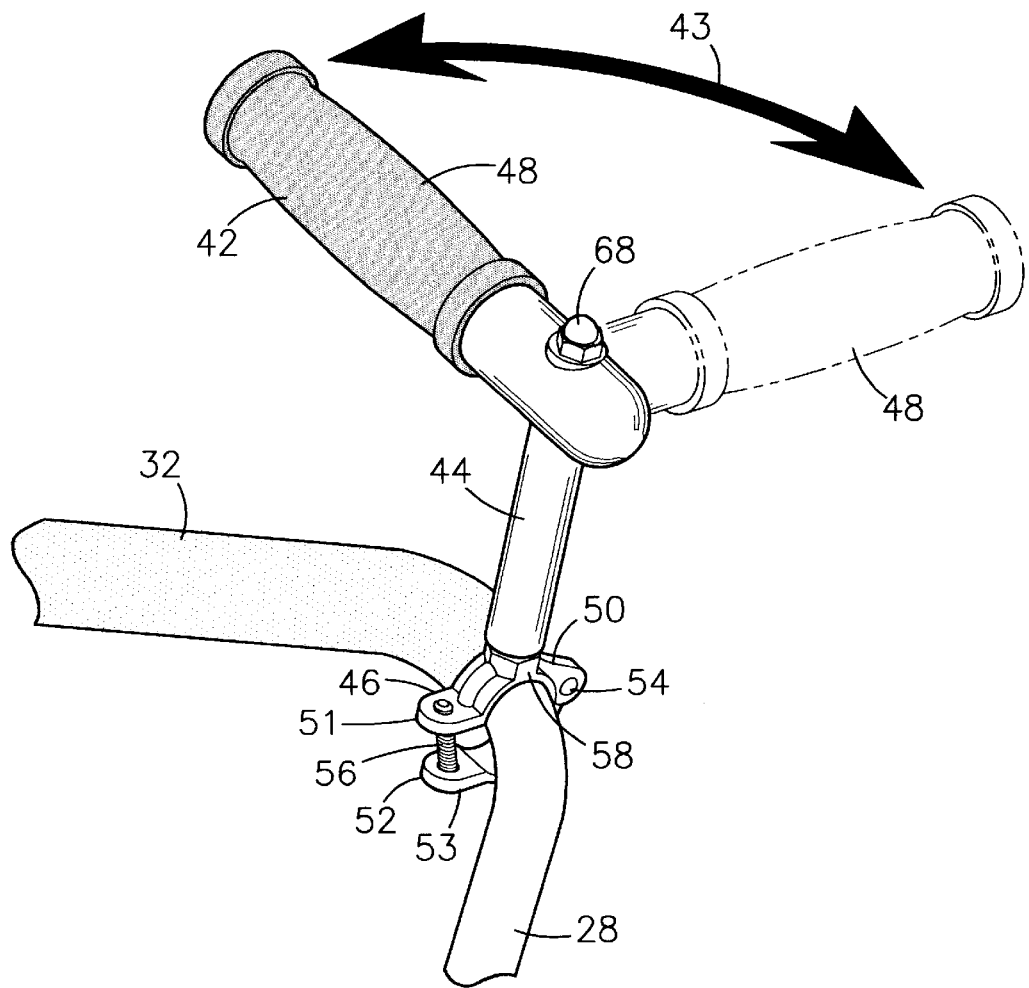
FIG. 2 is a perspective view of a flexible handle of the stroller of FIG. 1.
Figure 4:
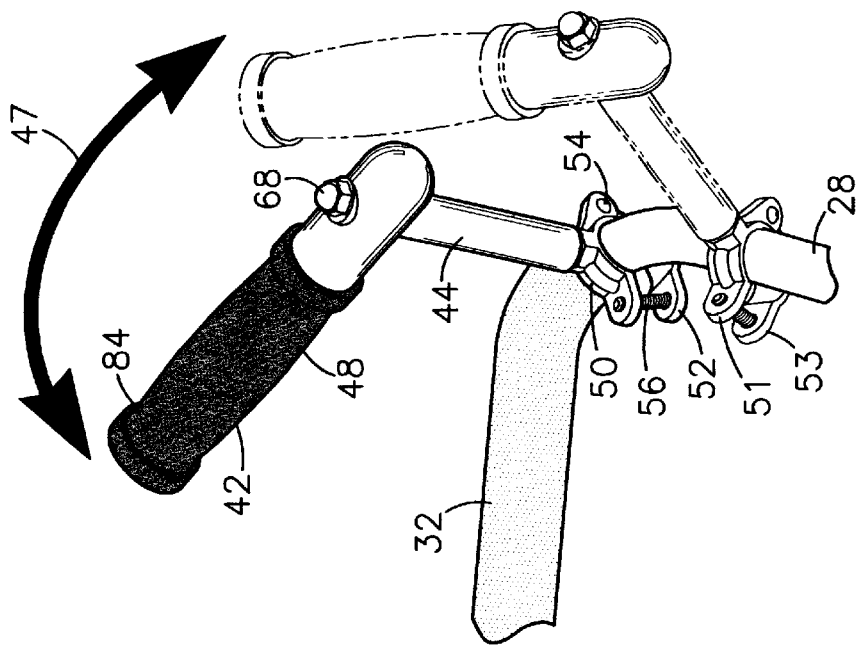
FIG. 4 is a perspective view of the flexible handle of FIG. 2 illustrating the handle in yet another position.
Figure 3:
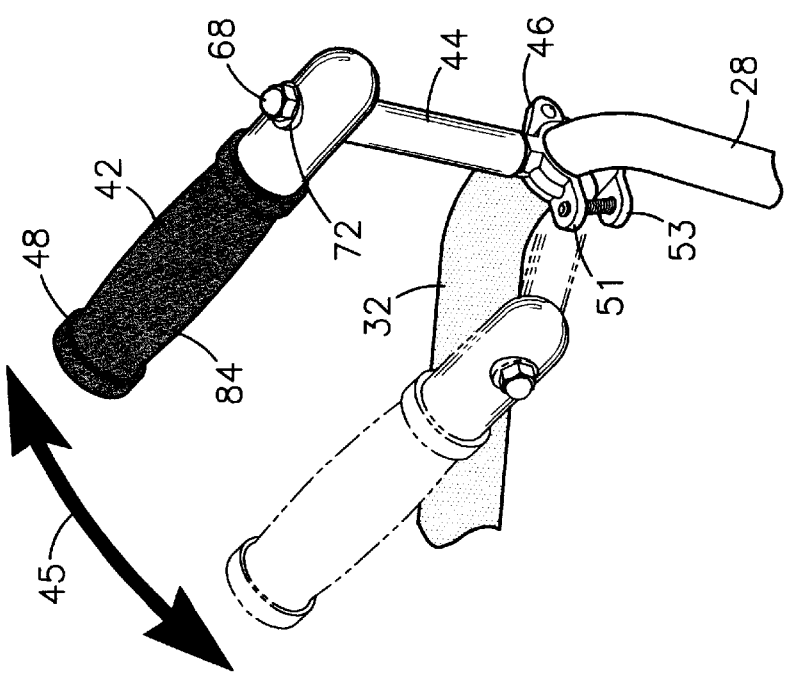
FIG. 3 is a perspective view of the flexible handle of FIG. 2 illustrating the handle in a different position.

Referring now to FIG. 2, each handle 42 is the same and operates in the same manner. The mounting clamp 46 includes an upper clamshell portion 50 and a bottom clamshell portion 52 connected together by the hinge 54 about which they pivot, allowing the clamp to be opened to pass it over the stroller handlebar 32 and then clamped into the desired position by the bolt 56 which is screwed into the threads tapped into the end flange 51 of the upper clamshell portion 50, with the head of the bolt 56 being passed though an aperture in the end flange 53 of the lower clamshell portion 52. As shown in FIGS. 3 and 4, the clamp can be slid along the horizontal stroller handlebar 32 at any desired location along the stroller handlebar 32, or may be adjusted along at least the upper portion of the seat frame rails 28. Each mounting clamp 46 can be rotated into any desired position about the portion of the stroller handlebar 32 or seat frame rail 28 before being tightened into the desired position. The handle element can be rotated about the stroller handlebar 32 as shown by the arrow 45 in FIG. 3. The handle 42 (the outer surface of which is the handle grip member 84) can be rotated throughout a full 360° about the handle stem member 44, as shown by the arrow 43 in FIG. 2. Referring to FIG. 4, the full adjustment of the position of the handles in three dimensions is illustrated by the arrow 47.

Referring again to FIG. 2, the handle stem member 44 is connected to the upper portion of the mounting clamp 46 and has an upper end that abuts one side of the handle element 48, which can pivot at the end of the stem member 44 through an entire 360° and can be tightened into the specific desired angle, as discussed in more detail below.

Figure 5:
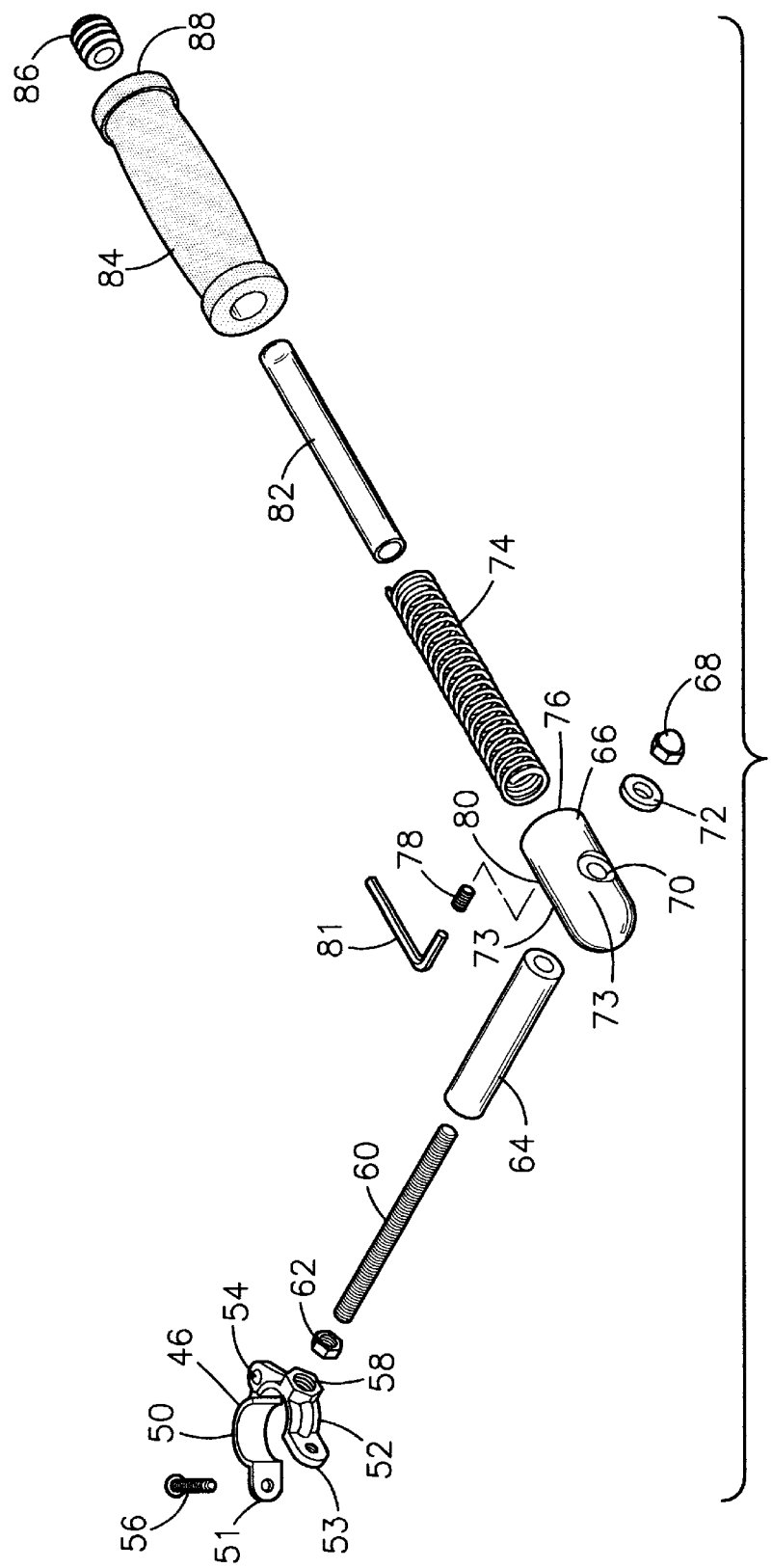
FIG. 5 is an exploded view of the handle assembly of FIG. 2.

Referring now to FIG. 5, the construction of the handles 42 is shown in exploded form. The upper surface of the mounting clamp 46 has a nut 58, which received the threaded stud 60, which is threaded throughout its entire length, but which may be threaded only adjacent to each end, and which is secured into the nut 58 by the jam nut 62. Alternatively, the threaded stud 60 can be welded or otherwise fixed to the upper surface of the mounting claim 46. A tubular collar forms the handle stem member 44 and slides over the threaded stud 60 to support the hollow tubular handle cap 66, which includes an aperture 70 through both sides to receive the threaded stud 60, which is secured to the handle cap 66 by the cap nut 68, which is placed over the washer element 72. The washer element 72 is a relatively thick element made from the same material and the same diameter of material as the tubular collar or stem member 44 and is seated in a recessed circular well 73 in the handle cap. The handle stem member 44 is itself seated into an identical recessed circular well 73 on the other side of the handle cap 66, which serves as a stop for the handle stem member 44. The assembly provides the user with the illusion that the handle stem member 44 passes through the entire diameter of the handle cap 66. The cap nut can be tightened to lock the handle element 48 into a desired position, or may be left loose enough that the handle element 48 rotates reciprocally during use.

Figure 6:
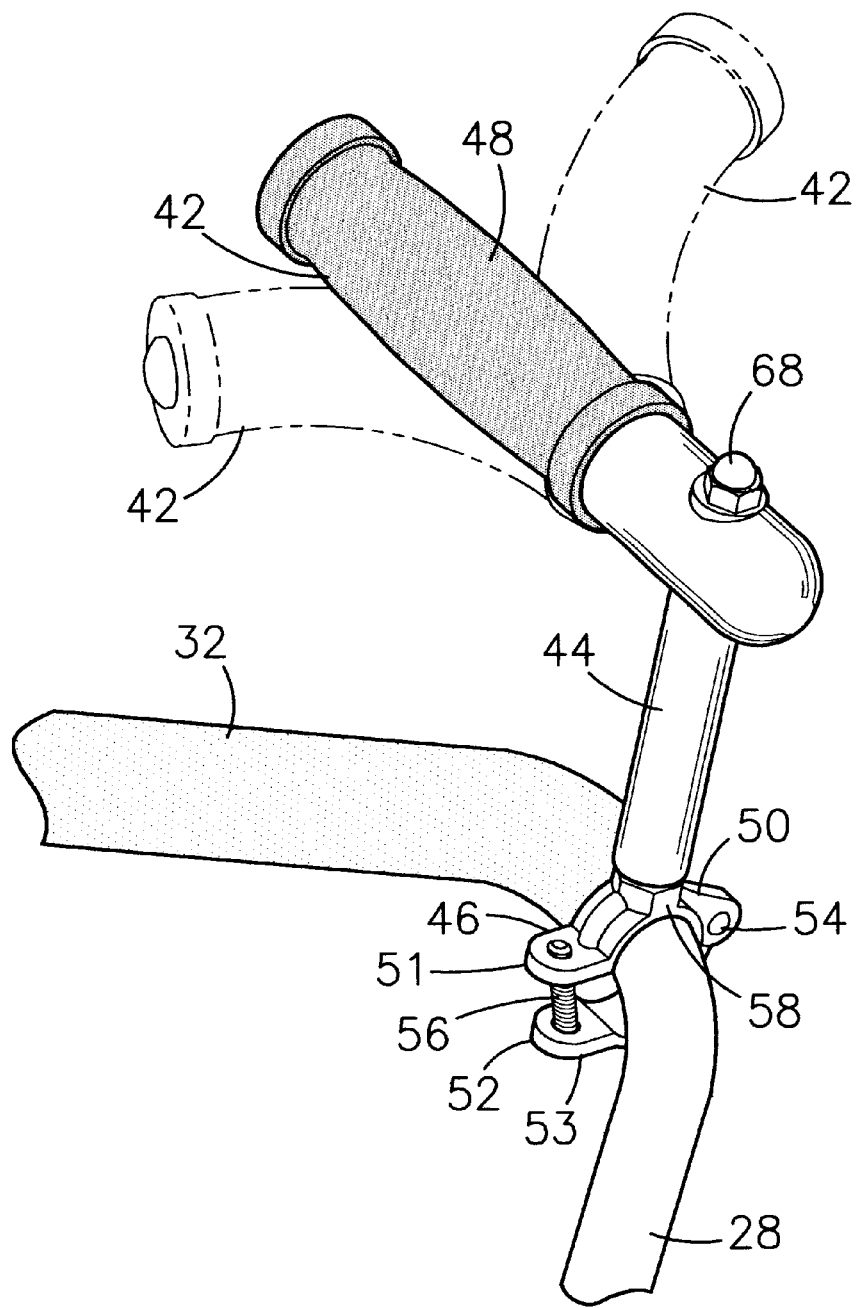
FIG. 6 is perspective view of the flexible handle of FIG. 2 illustrating the flexing action permitted by the coil spring member in the handle grip.

Still referring to FIG. 5, an elongated coil spring 74 is pushed into the open end 76 of the handle cap 66 and secured therein by the locking bolt 78 inserted into the aperture 80 in the handle cap 66, thereby providing a means for providing a flexible and resilient grip member responsive to hand motions of a user, that is connected to said handle cap 66. The locking bolt is tightened by the wrench 81, which is supplied with the stroller 10. A tubular stiffening member 82, preferably plastic, is inserted into the coil spring to provide some resistance to the sideways bending of the coil spring 74, to dampen the recoil and oscillation of the coil spring 74 and to prevent adjacent loops of the coil spring 74 from deforming and becoming caught in each other. A handle grip member 84, preferably plastic or foam rubber, having a central cylindrical opening throughout most of its length, is pressed onto the coil spring 74 until it abuts the open end of the handle cap 66, providing a handle grip member 84 disposed about the coil spring 74 and thereby providing a firm smooth high-friction grip for the user. A plug 86 inserted into the open end 88 of the handle grip member 84. The flexibility and resulting flexing action created by the user's hand movements while jogging and pushing the stroller 10 are illustrated in FIG. 6. In actual use, the handles 42 flex in many different directions with many different degrees of deviation from the equilibrium straight-line configuration of the coils springs 74, allowing the user a nearly completely natural movement of the hands, arms and shoulders while pushing the stroller, thereby reducing back strain.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims. A stroller according as discussed above may be made and sold as an entire unit or the handle portions can be sold separately and added to an existing stroller.

I claim:

1. In a stroller having a plurality of wheels connected to a frame, a seat connected to the frame and a handlebar connected to the frame rearward of the seat, the improvement comprising:
   a. at least one straight and rigid handle stem member;
   b. a bending flexible resilient handle element that bends and straightens in many different directions with many different degrees of deviation from a straight-line configuration in response to the hand motions of a user connected to said handle stem member and perpendicular to said handle stem member; and
   c. means for connecting said straight and rigid handle stem member to said handlebar of said stroller.

2. In a stroller having a plurality of wheels connected to a frame, a seat connected to the frame and a handlebar connected to the frame rearward of the seat, the improvement comprising:
   a. at least one straight and rigid handle stem member;
   b. a flexible resilient handle element connected to said handle stem member and perpendicular to said handle stem member; and
   c. means for connecting said straight and rigid handle stem member to said handlebar of said stroller, wherein said connecting means further comprises a mounting clamp.

3. In a stroller having a plurality of wheels connected to a frame, a seat connected to the frame and a handlebar connected to the frame rearward of the seat, the improvement in accordance with claim 2 wherein said mounting clamp further comprises a clamshell clamp having an upper clamshell portion connected to a lower clamshell portion by a hinge and means for fastening and closing said upper clamshell portion and said lower clamshell portion to said handlebar of said stroller.

4. In a stroller having a plurality of wheels connected to a frame, a seat connected to the frame and a handlebar connected to the frame rearward of the seat the improvement in accordance with claim 3 wherein said mounting clamp further comprises a nut attached to said upper clamshell portion of said clamshell clamp.

5. In a stroller having a plurality of wheels connected to a frame, a seat connected to the frame and a handlebar connected to the frame rearward of the seat, the improvement in accordance with claim 2 wherein said handle stem member further comprises a stud threaded at each end inserted though a cylindrical collar.

6. In a stroller having a plurality of wheels connected to a frame, a seat connected to the frame and a handlebar connected to the frame rearward of the seat, the improvement in accordance with claim 5 wherein said handle element further comprises a handle cap having an open end and means for providing a flexible and resilient grip member responsive to hand motions of a user connected to said handle cap and said handle element is fastened to said handle stem member by said threaded stud.

7. In a stroller having a plurality of wheels connected to a frame, a seat connected to the frame and a handlebar connected to the frame rearward of the seat, the improvement comprising:
   a. at least one handle stem member,
   b. a handle element connected to said handle stem member, wherein said handle element further comprises a handle cap having an open end and means for providing a flexible and resilient grip member responsive to hand motions of a user connected to said handle cap, said handle element further comprising a coil spring inserted into said open end of said handle cap; and
   c. means for connecting said handle stem member to said handlebar of said stroller.

8. In a stroller having a plurality of wheels connected to a frame, a seat connected to the frame and a handlebar connected to the frame rearward of the seat, the improvement in accordance with claim 7 further comprising a handle grip member disposed about said coil spring.

9. In a stroller having a plurality of wheels connected to a frame, a seat connected to the frame and a handlebar connected to the frame rearward of the seat the improvement in accordance with claim 7 further comprising means for dampening oscillation of said coil spring connected to said handle element.

10. In a stroller having a plurality of wheels connected to a frame, a seat connected to the frame and a handlebar connected to the frame rearward of the seat, the improvement in accordance with claim 7 further comprising an aperture through said handle cap that received said stud and a nut on said stud securing said handle cap to said stud.

11. In a stroller having a plurality of wheels connected to a frame, a seat connected to the frame and a handlebar connected to the frame rearward of the seat, the improvement comprising:
   a. at least one straight and rigid handle stern member fixed to said handlebar in a user selected stationary position and comprising a threaded stud inserted through a cylindrical collar
   b. a flexible resilient handle element connected to said handle stem member by said threaded stud and held perpendicular to said handle stem member; and
   c. a mounting clamp connected to one end of said handle stem member and fastened to said handlebar of said stroller.

12. In a stroller having a plurality of wheels connected to a frame, a seat connected to the frame and a handlebar connected to the frame rearward of the seat, the improvement in accordance with claim 11 wherein said mounting clamp further comprises a clamshell clamp having an upper clamshell portion connected to a lower clamshell portion by a hinge and means for fastening and closing said upper clamshell portion and said lower clamshell portion to said handlebar of said stroller.

13. In a stroller having a plurality of wheels connected to a frame, a seat connected to the frame and a handlebar connected to the frame rearward of the seat, the improvement in accordance with claim 12 wherein said mounting clamp further comprises a nut attached to said upper clamshell portion of said clamshell clamp.

14. In a stroller having a plurality of wheels connected to a frame, a seat connected to the frame and a handlebar connected to the frame rearward of the seat the improvement in accordance with claim 11 wherein said handle element further comprises a handle cap having an open end and means for providing a flexible and resilient grip member responsive to hand motions of a user inserted into said handle cap.

15. In a stroller having a plurality of wheels connected to a frame, a seat connected to the frame and a handlebar connected to the frame rearward of the seat, the improvement in accordance with claim 14 wherein said handle element farther comprises a coil spring inserted into said open end of said handle cap.

16. In a stroller having a plurality of wheels connected to a frame, a seat connected to the frame and a handlebar connected to the frame rearward of the seat, the improvement comprising:
   a. a pair of handle stem members, each said handle stem member further comprising a stud inserted into a collar;
   b. a separate handle element comprising a handle cap having an open end and means for providing a flexible and resilient grip member responsive to hand motions of a user inserted into said handle cap connected to each said handle stem member; and
   c. a mounting clamp connected to one end of said handle stem member and fastened to said handlebar of said stroller.

17. In a stroller having a plurality of wheels connected to a frame, a seat connected to the frame and a handlebar connected to the frame rearward of the seat, the improvement in accordance with claim 16 wherein said flexible and resilient grip member further comprises an elongated coil spring.

18. In a stroller having a plurality of wheels connected to a frame, a seat connected to the frame and a handlebar connected to the frame rearward of the seat, the improvement in accordance with claim 17 further comprising a handle grip member disposed about said coil spring.

19. In a stroller having a plurality of wheels connected to a frame, a seat connected to the frame and a handlebar connected to the frame rearward of the seat, the improvement in accordance with claim 17 further comprising means for fixing said elongated coil spring to said handle cap.

* * * * *